United States Patent [19]

Vissers et al.

[11] 3,731,523
[45] May 8, 1973

[54] HYDROGEN ACTIVITY METER

[75] Inventors: Donald R. Vissers, Naperville; John T. Holmes, Downers Grove; Paul A. Nelson, Wheaton, all of Ill.

[73] Assignee: The United States of America as represented by the United States Atomic Energy Commission, Washington, D.C.

[22] Filed: Feb. 23, 1971

[21] Appl. No.: 117,990

[52] U.S. Cl............................................73/19, 73/23
[51] Int. Cl.................................................G01n 7/10
[58] Field of Search......................................73/19, 23

[56] References Cited

UNITED STATES PATENTS

| | | | |
|---|---|---|---|
| 2,671,336 | 3/1954 | Hulsberg | 73/23 |
| 2,882,212 | 4/1959 | Beard | 73/23 X |
| 3,426,579 | 2/1969 | Lebel et al | 73/23 |
| 3,100,868 | 8/1963 | McAfee, Jr. | 73/23 X |

OTHER PUBLICATIONS

"Diffusion of Gases through Nickel," by Landecker et al. from The Review of Scientific Instruments, Vol. 25, No. 12, pp. 1151–1153, Dec. 1954.

*Primary Examiner*—James J. Gill
*Attorney*—Roland A. Anderson

[57] ABSTRACT

A device for and method of measuring the hydrogen concentration in liquid sodium. A thin-wall, tubular, annealed nickel probe in contact with liquid sodium is connected to an ion pump and a vacuum gauge. A vacuum is created within the nickel probe by the ion pump, which thereafter is isolated from the remainder of the device. Hydrogen atoms in the liquid sodium diffuse through the wall of the probe and into the interior thereof until an equilibrium between hydrogen atoms within the probe and hydrogen atoms in the liquid sodium is obtained. Such diffusion by hydrogen atoms into the probe results in a pressure change within the probe. The pressure change occurring between the time of initial probe evacuation and the time equilibrium of the hydrogen atoms is obtained is measured by the vacuum gauge, and this pressure change is indicative of the hydrogen concentration in the liquid sodium.

8 Claims, 5 Drawing Figures

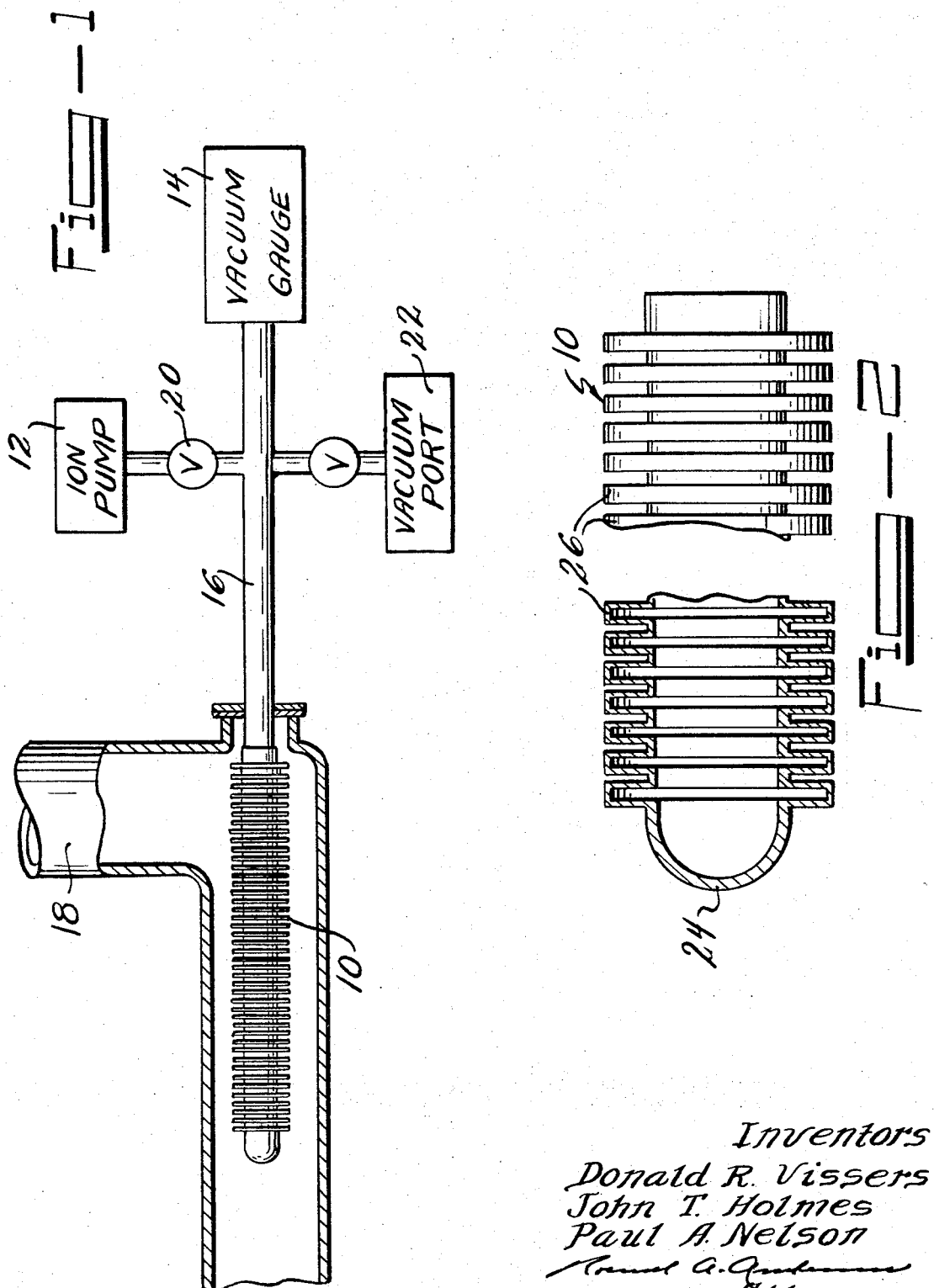

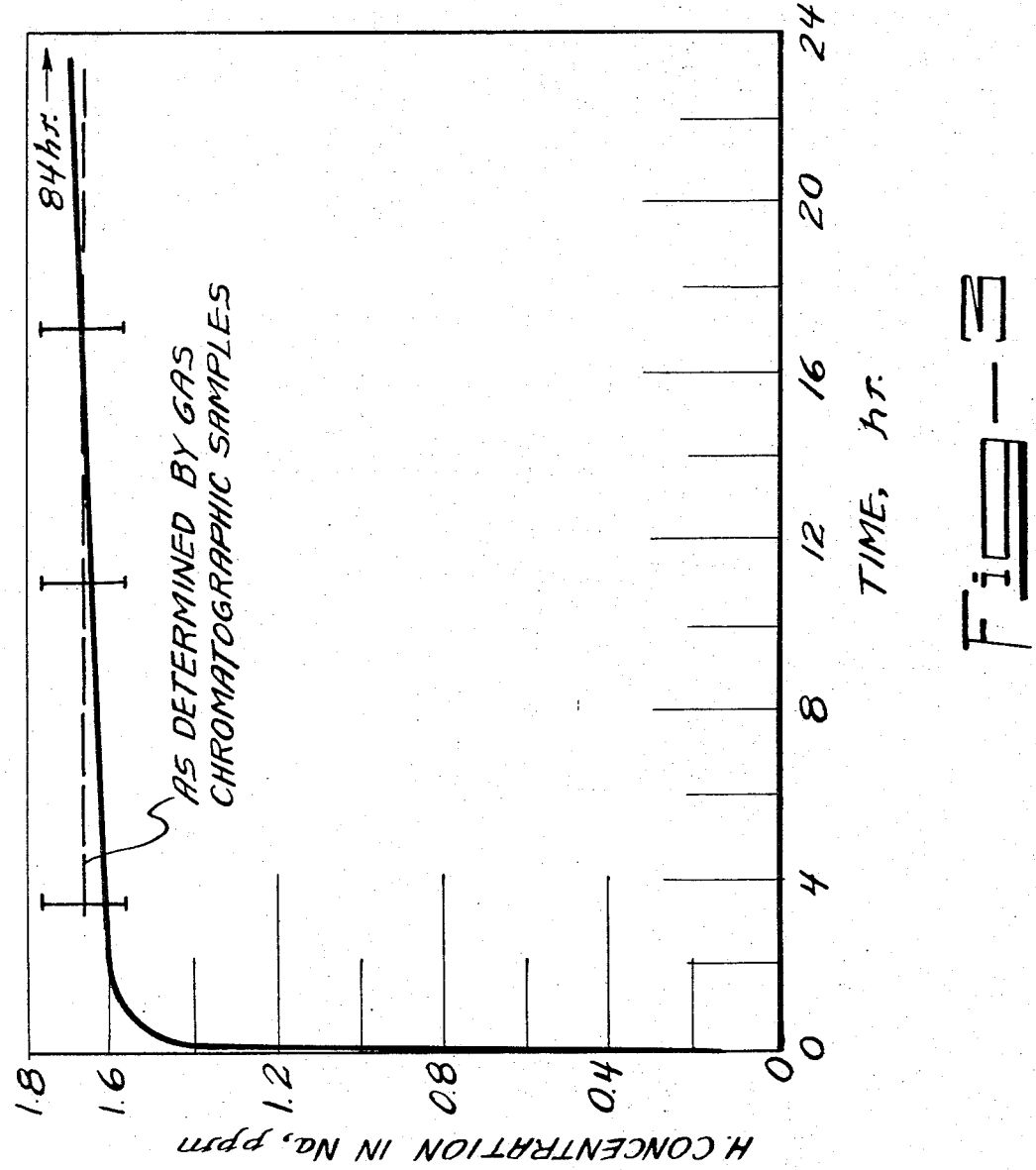

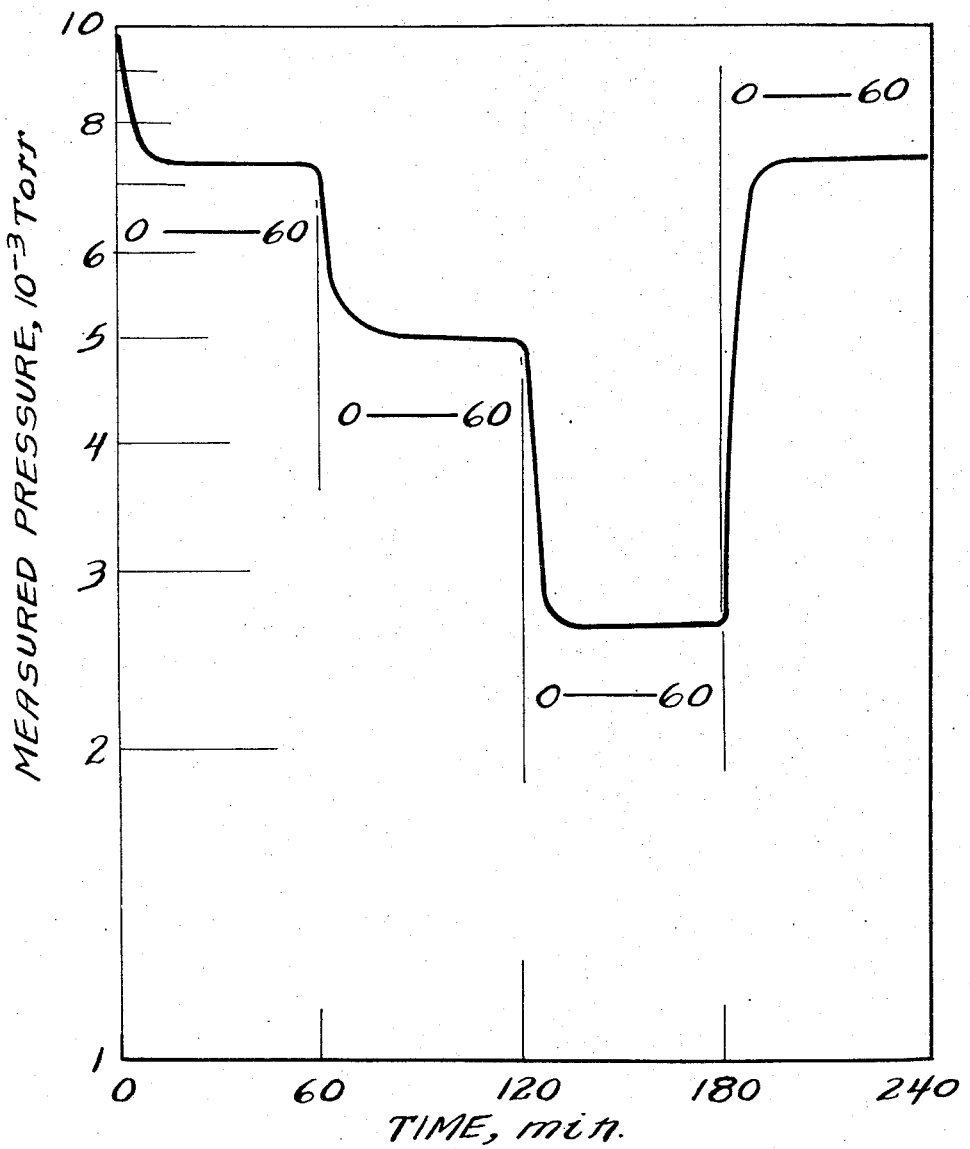

HYDROGEN ACTIVITY METER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the measurement of hydrogen in liquid sodium. More specifically, the invention relates to the measurement of the hydrogen concentration in the liquid sodium coolant of a liquid-sodium-cooled nuclear reactor.

The development of liquid-sodium-cooled nuclear reactors has generated a great deal of concern regarding the type and levels of impurities in the liquid sodium coolant. One such area of concern is the hydrogen concentration level in the sodium coolant system. Hydrogen can enter the sodium coolant in a number of ways, some of which include water leakage occurring in the steam generator tubes, air with its associated moisture entering during the changing of fuel elements, and hydrogen diffusion through the walls of the steam generator tubes. The determination of this hydrogen concentration is extremely important for several reasons. First, water leakage occurring in the steam generator can cause severe damage. While there are devices, herein termed leak detectors, whose function is to detect such water leakage, the sensitivity of such devices in most cases will be controlled by the general hydrogen level in the liquid sodium. Therefore, if these leak detectors are to perform properly with the required sensitivity, the general or normal hydrogen concentration in the liquid sodium must be known. Secondly, tritium decontamination in sodium-cooled nuclear reactors is very important. Since tritium is associated with the hydrogen in liquid sodium, knowledge of the hydrogen concentration will help determine the location of the tritium in the liquid sodium, the concentration of the tritium, and the best methods for removal of the tritium from the liquid sodium. Finally, knowledge of the hydrogen concentration will held avoid plugging of the sodium cooling system caused by the formation of sodium hydride, which will occur with certain hydrogen concentration and temperature conditions.

The device and method pursuant to the present invention detect and measure the hydrogen concentration, also termed hydrogen activity, in the liquid sodium. Such device and method, while not requiring a great deal of sensitivity nor a rapid response to hydrogen level changes, do require considerable accuracy in determining the hydrogen concentration. Without very accurate measurements of the hydrogen concentration, the above-mentioned purposes for obtaining such measurements cannot be met. Since the sodium coolant of a sodium-cooled nuclear reactor will have a normal hydrogen concentration level somewhere in the range of approximately 0.1 to 2.0 ppm, such a device and method should be sufficiently precise so as to be able to detect a hydrogen concentration as low as 0.1 ppm to an accuracy of $\pm 0.05$ ppm.

Other methods or devices for measuring the hydrogen concentration in liquid sodium include the following: removing a sodium sample from the sodium coolant followed by any number of various laboratory techniques for determining the hydrogen concentration of the sample; using a nickel tube in conjunction with a constant and preset vacuum and a Pirani vacuum gauge, placing the nickel tube in contact with the liquid sodium resulting in hydrogen continuously diffusing from the liquid sodium into the nickel tube, and recording the output of the vacuum gauge as a function of time, from this determining the hydrogen concentration of the liquid sodium; using an oil diffusion pump in conjunction with a nickel membrane in contact with liquid sodium, causing the hydrogen in the liquid sodium to continuously diffuse across the nickel membrane, and from this determining the hydrogen concentration of the liquid sodium with a mass spectrometer; and removing hydrogen from the liquid sodium by diffusion across a nickel-coated palladium membrane with subsequent oxidation of the hydrogen by the palladium to form $H_2O$ which is then quantitatively measured. Some of these devices, however, may not be as accurate as required. Others, while sufficiently accurate, may be either cumbersome and time consuming or require rather complex and expensive equipment.

It is, therefore, an object of this invention to provide a device for and method of measuring the hydrogen concentration in liquid sodium.

It is a further object to provide a device for and method of measuring the hydrogen concentration in liquid sodium without the necessity of removing sodium samples from the liquid sodium.

It is also an object of this invention to provide a device for and method of measuring the hydrogen concentration in the liquid sodium coolant of a sodium-cooled nuclear reactor in a manner which is simple, reliable and sufficiently accurate so as to detect a hydrogen concentration of at least $0.1 \pm 0.01$ ppm.

Further objects and advantages of the invention will be apparent from the following detailed description of the device and method.

SUMMARY OF THE INVENTION

In practicing this invention for the measuring of the hydrogen concentration in liquid sodium, a thin-wall, tubular, annealed nickel probe whose outer surface is in contact with the liquid sodium is connected to an ion pump and a vacuum gauge. The ion pump creates a vacuum within the nickel probe of approximately $10^{-6}$ to $10^{-8}$ Torr, after which the ion pump is isolated from the remainder of the described system b use of a valve. Hydrogen by in the liquid sodium diffuse through the wall of the nickel probe and into the probe's interior until an equilibrium between hydrogen atoms in the liquid sodium and hydrogen atoms within the probe is obtained. As hydrogen atoms diffuse into the nickel probe, the pressure within the probe changes, and the pressure change occurring between the time of initial probe evacuation by the ion pump and the time equilibrium of the hydrogen atoms is obtained is measured by the vacuum gauge. This pressure change is indicative of the hydrogen concentration in the liquid sodium.

It will be observed that this device and method differ in a very significant way from the apparently similar prior art cited previously in this specification. This apparently similar art has as its basis a diffusion-type measuring system whereby hydrogen diffuses continuously through a membrane, subsequently measuring the diffusing hydrogen in some manner and calculating the hydrogen concentration in the liquid sodium from these measurements. The present device and method has as its basis an equilibrium diffusion-type measuring system with a direct pressure readout of the hydrogen concentration in the liquid sodium whereby the hydrogen does not diffuse continuously but only until an equilibrium between the hydrogen on both sides of the membrane is obtained. From the partial pressure of hydrogen occurring at equilibrium the hydrogen concentration in the liquid sodium is measured directly, as will be explained later in this specification.

It will be noted that the present device and method are related to the device and method disclosed in patent application Ser. No. 92,466, the assignee of that patent application being the same as the assignee of the present application. The device and method according to Ser. No. 92,466 are based also on a diffusion-type measuring system as mentioned above, while the present device and method are based on an equilibrium diffusion-type measuring system. One reason for the difference is that the basic function of the device and method according to application Ser. No. 92,466 is different from that of the present device and method. The basic function of the former device and method is to detect water leakage into the liquid sodium by measuring very small changes in the hydrogen concentration level, while the basic function of the present device and method is to measure the general or normal hydrogen concentration level in liquid sodium and not small changes therein. As leak detectors, the device and method of Ser. No. 92,466 must be extremely sensitive to very small hydrogen concentration changes as well as detecting such changes quite rapidly. However, in performing this function the actual measurement of the hydrogen concentration level need not be accurate, so long as small changes therein are detected. The present device and method need not be sensitive to hydrogen concentration changes nor respond rapidly in measuring the hydrogen concentration. However, as previously mentioned, it must measure the general or normal hydrogen concentration level in the liquid sodium with great accuracy and preciseness.

On a liquid-sodium-cooled nuclear reactor, numerous devices of both types mentioned above will be present, each measuring a different parameter and serving a different function. The sensitivity of the leak detector as disclosed in patent application Ser. No. 92,466 will be controlled by how accurate the normal hydrogen concentration level in the liquid sodium is measured and known.

BRIEF DESCRIPTION OF THE DRAWINGS

A device illustrating the present invention is shown in the drawings, of which:

FIG. 1 is a view showing the components of a device illustrating an application of the present invention.

FIG. 2 is an enlarged, partially sectional view of a nickel probe used in the practicing of the present invention.

FIG. 3 is a graph showing the results of an application of the present invention, indicating the hydrogen concentration in liquid sodium as a function of time.

FIG. 5 is a graph showing the time required for hydrogen to reach equilibrium at 500°C.

DETAILED DESCRIPTION OF THE INVENTION

Figure 4:
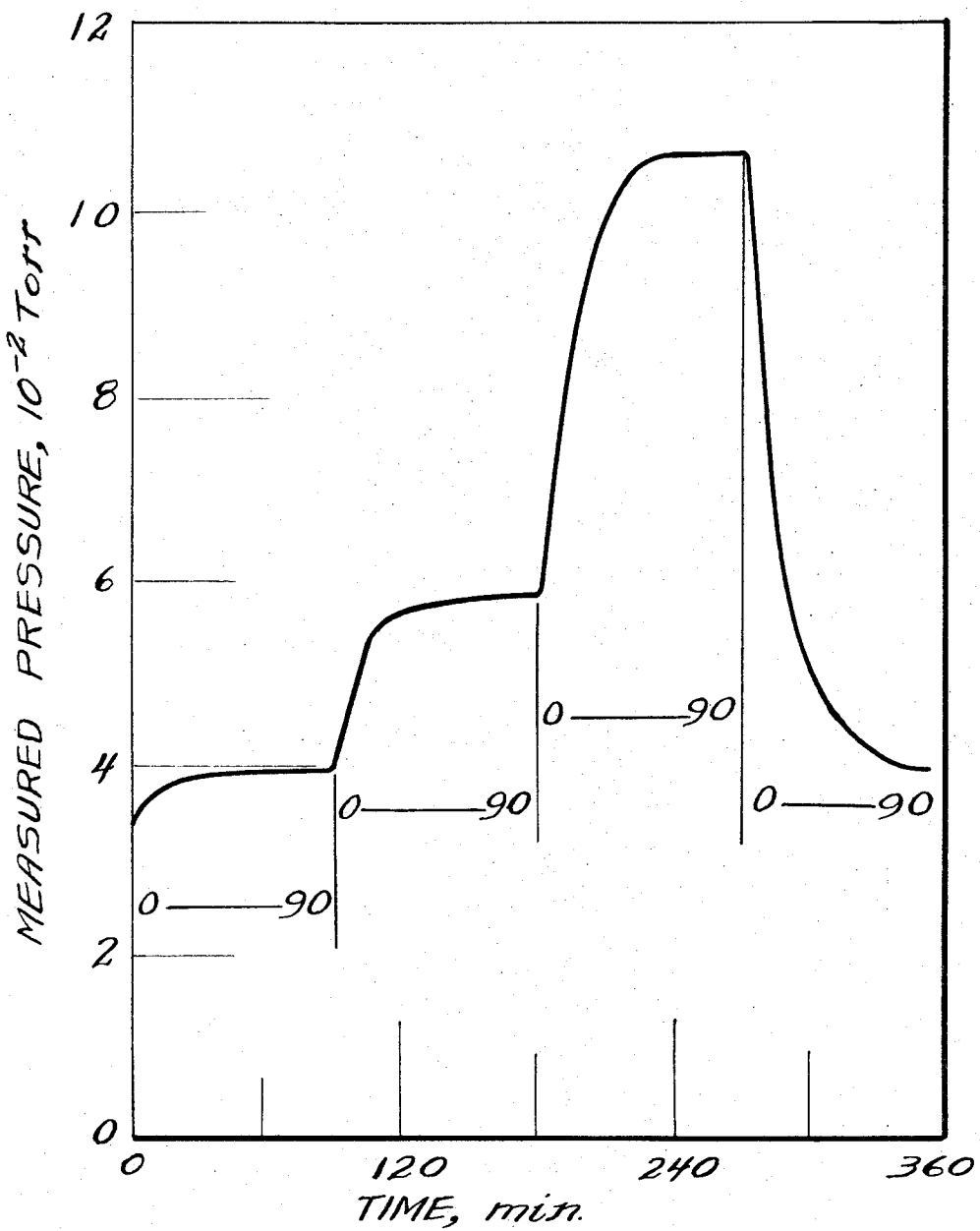
FIG. 4 is a graph showing the time required for hydrogen to reach equilibrium at 372°C.

In FIG. 1 there is shown a device illustrating the application of the present invention whereby nickel probe 10, connected to an ion pump 12 and a vacuum gauge 14 by way of tubing 16, is inserted into pipe 18 which contains hot flowing liquid sodium. Nickel probe 10 and tubing 16 are evacuated to a pressure of $10^{-6}$ to $10^{-8}$ Torr by ion pump 12. Ion pump 12 is then isolated from the remainder of the system by valve 20. The partial pressure of hydrogen in the liquid sodium causes hydrogen atoms to diffuse through the wall of probe 10 and into its interior until an equilibrium between the hydrogen atoms within probe 10 and hydrogen atoms in the liquid sodium is obtained. This diffusion of hydrogen atoms into probe 10 causes a decrease in the vacuum within the probe. The vacuum continues to decrease until the stated equilibrium occurs. This total pressure change within probe 10 between the time of initial evacuation of probe 10 to the time that equilibrium of the hydrogen atoms is obtained is determined from vacuum gauge 14 and is indicative of the hydrogen concentration in the liquid sodium.

In order to initiate operation of ion pump 12, a vacuum of approximately $10^{-3}$ Torr must first be created within probe 10, tubing 16 and ion pump 12. Any means to accomplish this may be used. In the preferred embodiment, vacuum port 22, comprising a high-purity copper pinch-off fitting, is located on tubing 16 between probe 10 and ion pump 12. A standard sorption vacuum pump is attached to vacuum port 22 and is used to obtain the desired vacuum of $10^{-3}$ Torr. Once this vacuum has been obtained and ion pump 12 put into operation, the sorption pump is pinched off at fitting 22 and removed, fitting 22 retaining an air-tight seal after the removal of the sorption pump.

FIG. 2 shows the preferred structure for nickel probe 10, although the invention is not limited to the use of such structure. Probe 10 is constructed from nickel due to the fact that nickel is chemically inert in liquid sodium as well as being selectively permeable to hydrogen diffusion. Probe 10 is tubular in shape and 1 to 4 inches in length, the particular device illustrated being 2.5 inches in length. It has an inner diameter no greater than 0.5 inch, the preferred diameter being 9/32 inch, which is sufficiently small to allow the hydrogen to be rapidly drawn away from the inner surface of wall 24, thereby promoting rapid hydrogen diffusion. Circumferential nickel fins 26 are 3/32 inch in height and number 15 per inch of probe length. The hollow fins 26 give probe 10 mechanical strength while creating a large surface area of approximately 80 $cm^2$ in a 2.5-inch-long probe for sufficient hydrogen diffusion. The surface area of probe 10 is of greater significance than its actual length, for the surface area must be sufficiently great, 40 to 160 $cm^2$, so as to be able to accurately detect the hydrogen in the liquid sodium. Wall 24 can range from 0.008 to 0.020 inch in thickness, the preferred thickness being 0.01 inch.

A critical characteristic of probe 10 is that it must be annealed at 600° to 900°C. for 10 to 60 hours, the preferred annealing being performed at 800°C. for 25 to 30 hours. This was discovered to be necessary if a uniform diffusion rate of hydrogen through wall 24 is to be maintained over an extended period of time while probe 10 remains in contact with hot liquid sodium. Without such annealing, the hot liquid sodium would itself slowly anneal probe 10 over a period of time, thereby gradually and continually changing the hydrogen diffusion properties of probe 10. This would result in the illustrated device being insufficiently accurate as well as requiring constant calibration.

Returning to FIG. 1, the size of ion pump 12, meaning thereby the pumping rate of the ion pump, is directly related to the surface area of probe 10 and the particular vacuum required, in this case $10^{-6}$ to $10^{-8}$ Torr. In the particular device illustrated, ion pump 12 has a pumping rate of 11 liters/second. The lower limitation to the size of ion pump 12 would be 1 liter/second, for below this pumping rate the size of probe 10 would be too small to obtain an accurate measurement of the hydrogen concentration in the liquid sodium. The upper limitation to the size of ion pump 12 would be 20 liters/second, for a pumping rate greater than this would require very large fittings as well as a very large probe 10, which is undesirable, if the required vacuum of $10^{-6}$ to $10^{-8}$ Torr is to be obtained.

Vacuum gauge 14 may be of any type so long as it measures accurately a pressure within a range of at least 1.0 to $10^{-6}$ Torr. In one preferred embodiment, vacuum gauge 14 comprises a hot cathode-triode ion gauge, hereinafter termed a millitorr gauge. Such vacuum gauge operates by ionizing the hydrogen atoms entering the gauge with accelerated electrons, the hydrogen ions subsequently collecting on cathode plates. A current fed to the cathode-collector plates is measured and indicated in terms of hydrogen pressure.

The total pressure change occurring from the time of initial evacuation of probe 10 to the time at which equilibrium of the hydrogen atoms is obtained as determined from vacuum gauge 14 is a measurement of the partial pressure of hydrogen within probe 10, which is in equilibrium with the hydrogen in the liquid sodium. This partial pressure of hydrogen within probe 10 is related by Sievert's Law to the hydrogen concentration in the liquid sodium, wherein the hydrogen concentration in liquid sodium, S, equals the square root of the hydrogen partial pressure, P, within probe 10 times a constant K. See equation (1):

$$KP^{1/2} = S \qquad (1)$$

Therefore, from this pressure change determined from vacuum gauge 14, the hydrogen concentration in the liquid sodium can be calculated. However, a preferred method is simply to initially calibrate vacuum gauge 14 in terms of known concentrations of hydrogen in liquid sodium, thereby eliminating any need for calculation and allowing the hydrogen concentration in the liquid sodium to be determined directly from vacuum gauge 14. The table below indicates a set of values determined by Sievert's Law for such a calibration.

| Hydrogen concentration in sodium (ppm) | Hydrogen Partial Pressure at Equilibrium (Torr) |
| --- | --- |
| 0.01 | $4.64 \times 10^{-6}$ |
| 0.02 | $1.86 \times 10^{-5}$ |
| 0.10 | $4.64 \times 10^{-4}$ |
| 0.20 | $1.86 \times 10^{-3}$ |
| 1.00 | $4.64 \times 10^{-2}$ |
| 2.00 | $1.86 \times 10^{-1}$ |

Measuring the hydrogen concentration in liquid sodium was performed by connecting a thin-wall, tubular nickel probe, having been annealed at approximately 800°C. for 25 to 30 hours, to an 11 liter/second ion pump and a millitorr gauge. The nickel probe and ion pump were then evacuated to $10^{-3}$ Torr using a standard sorption pump, after which the operation of the ion pump was initiated and the standard sorption pump removed. A vacuum of $10^{-6}$ to $10^{-8}$ Torr was created within the nickel probe by the ion pump. The nickel probe was then inserted, after having isolated the ion pump from the rest of the system, into the liquid sodium having a temperature of 400°C. flowing through pipe 18. Hydrogen atoms diffused through the wall of the nickel probe and into its interior until an equilibrium between the hydrogen atoms within the probe and hydrogen atoms in the liquid sodium was obtained. The pressure changes within the nickel probe were measured as hydrogen atoms diffused into the probe, and as previously explained, the total pressure change occurring between the time of initial probe evacuation to the time of hydrogen atom equilibrium was indicative of the hydrogen concentration in the liquid sodium, that change measured as $1.3 \times 10^{-1}$ Torr or 1.68 ppm hydrogen concentration in the liquid sodium. These results were verified by determining the liquid sodium's hydrogen concentration by gas chromatographic methods. FIG. 3 is a graph of these readings in terms of ppm hydrogen concentration in the liquid sodium as a function of time. The results obtained by gas chromatographic methods are also included and confirm the hydrogen concentration measurement within the experimental error indicated by the bars. These and other results have shown that the present method is sufficiently precise to detect a hydrogen concentration of 0.02 ppm to an accuracy of ± 0.01 ppm, which is well within the stated requirement and a much greater accuracy than expected. The nickel probe was evacuated prior to inserting the probe into the liquid sodium in order to check for any leaks in the system.

It is important that the vacuum created within the nickel probe by the ion pump be within the stated range of $10^{-6}$ to $10^{-8}$ Torr. A vacuum higher than $10^{-8}$ Torr will allow background noise due to natural hydrogen gases in the system to interfere with consistent and correct readings of the vacuum gauge. If the vacuum is lower than $10^{-6}$ Torr, the ion pump will overheat.

It might be noted that while the present device and method as previously explained need not respond rapidly in measuring the hydrogen concentration in liquid sodium, the approximate time required for hydrogen to reach equilibrium can be easily determined. Such knowledge of this approximate time requirement may simplify somewhat the actual operation of measuring the hydrogen concentration. The time required to reach equilibrium is dependent upon the temperature of operation. FIG. 4 is a graph showing the hydrogen pressure within the nickel probe at 372°C. at four different hydrogen concentration levels. As the hydrogen concentration level was changed, the time required to reach hydrogen equilibrium at 372°C. was 40 to 60 minutes. FIG. 5 is a similar graph, the measurements taken at a temperature of 500°C. As indicated by the figure, the time required to reach hydrogen equilibrium at 500°C. was 10 to 20 minutes.

The disclosed device and method as an application of the present invention have a much greater accuracy and precision than the minimum required for such a device and method if they are to be effective. Since there will be many such hydrogen concentration detection units on a sodium-cooled nuclear reactor, the fact that the disclosed device and method are relatively inexpensive is another advantage. They also have the further advantage of simplicity and direct measurement of the hydrogen concentration without the requirement of subsequent calculations. Finally, they do not have the disadvantage of requiring removal of sodium from the system in order to make hydrogen concentration measurements, such techniques requiring the removal of sodium being slow and inaccurate as well as placing personnel in the position of possible irradiation.

It will be understood that the invention is not to be limited to the details given herein but that is may be modified within the scope of the appended claims.

The embodiments of the invention in which an exclusive property or privilege is claimed are defined as follows:

1. An equilibrium diffusion-type device for measuring hydrogen concentration in liquid sodium comprising a tubular, thin-wall nickel probe, which has been annealed at a temperature of 600° to 900° C. for 10 to 60 hours, having a large outer surface area of 40 to 160 cm$^2$ exposed to the liquid sodium; an ion pump connected to said tubular nickel probe operable to evacuate the interior of the nickel probe to $10^{-6} - 10^{-8}$ Torr whereby hydrogen atoms in the liquid sodium, after evacuation of the nickel probe, diffuse through the wall of the nickel probe into the interior thereof until an equilibrium between hydrogen atoms within said nickel probe and hydrogen atoms in said liquid sodium is obtained; means for isolating said ion pump from said nickel probe subsequent to evacuation of the probe and prior to the diffusion of said hydrogen atoms into the probe; and pressure-indicating means connected to said nickel probe operable to measure a vacuum within said probe within the range of 1.0 to $10^{-6}$ Torr, the pressure change occurring within said nickel probe after evacuation thereof and resulting from the attainment of said equilibrium between hydrogen atoms within the nickel probe and hydrogen atoms in the liquid sodium being directly indicative of the hydrogen concentration in the liquid sodium.

2. The device according to claim 1 wherein said nickel probe has a wall thickness of 0.008 to 0.020 inch, an inner diameter no greater than 0.5 inch, and a length of 1 to 4 inches.

3. The device according to claim 2 wherein said ion pump has a pumping rate of 1 to 20 liters/sec.

4. The device according to claim 2 wherein said nickel probe comprises a tubular member, said tubular member being 2.5 inches in length and having an inner diameter of 9/32 inch and a wall thickness of 0.01 inch; and hollow, circumferential nickel fins, numbering 15 fins per inch of length of said tubular member, having a wall thickness of 0.01 inch and projecting 3/32 inch out from the outer surface of said tubular member, said fins, the interiors of which are open to the interior of said tubular member, providing increased mechanical strength and increased surface area for greater hydrogen diffusion, the surface area of said nickel probe being approximately 80 cm$^2$.

5. The device according to claim 4 wherein said nickel probe has been annealed at 800°C. for 25 to 30 hours.

6. The device according to claim 5 wherein said ion pump has a pumping rate of 11 liters/sec.

7. The device according to claim 6 wherein said pressure-indicating means comprises a hot cathode-triode ion gauge wherein said pressure change occurring within the nickel probe is indicated in terms of hydrogen concentration in said liquid sodium to an accuracy of $0.02 \pm 0.01$ ppm.

8. An equilibrium diffusion-type method for measuring hydrogen concentration in liquid sodium comprising connecting a tubular, thin-walled nickel probe, which has been annealed at a temperature of 600° to 900°C. for 10 to 60 hours, to an ion pump and a vacuum gauge, said probe having a large surface area of 40 to 160 cm$^2$; creating a vacuum with said ion pump of $10^{-6}$ to $10^{-8}$ Torr within the nickel probe; isolating said ion pump from said nickel probe; contacting the outer surface of said nickel probe with liquid sodium, thereby causing hydrogen atoms in said liquid sodium to diffuse through the wall of the nickel probe and into the interior thereof until an equilibrium between hydrogen atoms in the nickel probe and hydrogen atoms in the liquid sodium is obtained; and measuring the pressure change occurring within the nickel probe after the hydrogen atoms have reached said equilibrium, said pressure change being directly indicative of the hydrogen concentration in the liquid sodium.

* * * * *